(12) United States Patent
Haneda et al.

(10) Patent No.: US 7,182,986 B1
(45) Date of Patent: Feb. 27, 2007

(54) CONTAINER CAP

(75) Inventors: Yasuhiko Haneda, Kurahiki (JP); Hong-Ta James Chan, Pasadena, TX (US)

(73) Assignee: Kuraray Co., Ltd., Kurashiki (JP)

( * ) Notice: Subject to any disclaimer, the term of this patent is extended or adjusted under 35 U.S.C. 154(b) by 1529 days.

(21) Appl. No.: 09/112,642

(22) Filed: Jul. 9, 1998

(51) Int. Cl.
*B29D 22/00* (2006.01)
*B32B 27/30* (2006.01)
*B65D 53/00* (2006.01)

(52) U.S. Cl. ............... 428/36.6; 428/522; 215/347; 215/349

(58) Field of Classification Search ............ 215/347, 215/349; 428/36.6, 500, 522, 523
See application file for complete search history.

(56) References Cited

U.S. PATENT DOCUMENTS

| | | | | |
|---|---|---|---|---|
| 3,564,303 A | * | 2/1971 | Gell ........................ 310/8.1 |
| 4,082,854 A | * | 4/1978 | Yamada et al. ............. 426/106 |
| 4,281,045 A | * | 7/1981 | Sumi et al. ................. 428/516 |
| 4,341,879 A | * | 7/1982 | Sugio et al. .................. 524/91 |
| 4,572,854 A | * | 2/1986 | Dallmann et al. ............ 428/35 |
| 4,576,995 A | * | 3/1986 | Nakabayashi et al. ...... 525/285 |
| 4,619,848 A | * | 10/1986 | Knight et al. ................ 428/35 |
| 4,640,428 A | * | 2/1987 | Chang ........................ 215/270 |
| 4,723,678 A | * | 2/1988 | Kollen et al. ............... 215/347 |
| 4,756,437 A | * | 7/1988 | Rossi-Mossuti ............. 215/230 |
| 4,789,074 A | * | 12/1988 | Han .......................... 215/347 |
| 4,904,512 A | * | 2/1990 | Yamada et al. ............ 428/36.7 |
| 4,981,231 A | * | 1/1991 | Knight ........................ 215/341 |
| 5,045,594 A | * | 9/1991 | Samuel et al. ................ 525/57 |
| 5,186,991 A | * | 2/1993 | Samuel et al. ............. 428/35.8 |
| 5,211,974 A | * | 5/1993 | White ........................ 426/106 |
| 5,298,334 A | * | 3/1994 | Moriyama et al. ....... 428/474.4 |
| 5,362,531 A | * | 11/1994 | Samuel et al. ............. 428/36.6 |
| 5,399,619 A | * | 3/1995 | Torradas et al. .............. 525/57 |
| 5,639,525 A | | 6/1997 | Kuhn et al. .............. 428/535.5 |

(Continued)

FOREIGN PATENT DOCUMENTS

EP          129309          *    4/1984

(Continued)

OTHER PUBLICATIONS

US Abstracts and claim pp. of 5,183,848, Feb. 2, 1993, 2 pages.

(Continued)

*Primary Examiner*—Kevin R. Kruer
(74) *Attorney, Agent, or Firm*—Oblon, Spivak, McClelland, Maier & Neustadt, P.C.

(57) ABSTRACT

Disclosed is a container cap having, as a sealing gasket, a layer of a resin composition as adhered to the surface of the cap body of polypropylene, wherein said resin composition comprises (A) from 25 to 70% by weight of an ethylene-vinyl alcohol copolymer having an ethylene content of from 20 to 60 mol % and a degree of saponification of at least 96% and (B) from 30 to 75% by weight of a polyolefin having a propylene or 1-butene content of at least 50 mol %. The container cap has excellent gas-barrier properties and sealability for containers, and is suitable for packaging containers for foods, medicines, agricultural chemicals, etc.

12 Claims, 1 Drawing Sheet

U.S. PATENT DOCUMENTS

| | | | | |
|---|---|---|---|---|
| 5,731,053 A | * | 3/1998 | Kuhn et al. | 428/369.2 |
| 5,756,178 A | * | 5/1998 | Obadia | 428/66.4 |
| 5,791,879 A | * | 8/1998 | Fitzgerald et al. | 416/229 A |
| 5,849,419 A | * | 12/1998 | Josephy et al. | 428/516 |
| 5,895,797 A | * | 4/1999 | Hayashihara et al. | 525/95 |

FOREIGN PATENT DOCUMENTS

| | | | |
|---|---|---|---|
| EP | 129310 | * | 4/1984 |
| EP | 129309 A | * | 8/1988 |
| EP | 0 761 752 | | 3/1997 |
| GB | 1112025 | * | 10/1964 |
| WO | WO 98/05731 | | 2/1998 |

OTHER PUBLICATIONS

US Abstracts and claim pp. of 5,186,991, Feb. 16, 1993, 3 pages.
US Abstracts and claim pp. of 5,362,531, Nov. 8, 1994, 3 pages.
US Abstracts and claim pp. of 5,430,098, Jul. 4, 1995, 2 pages.
Official Communication Under Rule 51(4) EPC in EP 99113572.4 (4 pp).
Allowed Claims in EP 99 11357 2.4 (2 pp).
U.S. Appl. No. 10/796,072, filed Mar. 10, 2004, Michihata, et al.
U.S. Appl. No. 10/796,012, filed Mar. 10, 2004, Michihata, et al.
U.S. Appl. No. 09/112,642, filed Jul. 9, 1998, Haneda, et al.
Allowed U.S. Appl. No. 09/002,081, filed Dec. 31, 1997.
Pending U.S. Appl. No. 09/112,642, filed Jul. 9, 1998.
U.S. Appl. No. 11/144,766, filed Jun. 6, 2005, Chan, et al.
U.S. Appl. No. 09/112,642, filed Jul. 9, 1998, Haneda, et al.

* cited by examiner

CONTAINER CAP

BACKGROUND OF THE INVENTION

1. Field of the Invention

The present invention relates to a container cap having good gas-barrier properties.

2. Description of the Background

Most containers for foods, industrial goods and others are required to have gas-barrier properties in order to prevent external gases such as oxygen and others from penetrating thereinto and to prevent active components and others existing therein from vaporizing out of them. Many methods are known for making container bodies have gas-barrier properties. For example, known are multi-layered containers comprising a gas-barrier material of gas-barrier resin, aluminium foil or the like, and glass containers. However, most caps, especially plastic caps for those containers are not made to have barrier properties, as their surface area to be kept in contact with contents is small. In the recent situation in the art, however, containers are required to have much better barrier properties, for which, therefore, it is much desired to provide caps having good barrier properties.

For making container caps have barrier properties, known is a method of adhering a gas-barrier material of aluminium or the like to the inner surface of caps while being laminated with an adhesive resin. However, gaskets of a multi-layered sheet of that type are generally produced by blanking the sheet having been prepared previously, and are therefore problematic in that their producibility is low and that the burrs formed in the blanking step are difficult to recycle as containing metals. Still another problem is that the technique of adhering the gas-barrier material to the inner surface of caps is extremely difficult in view of the poor adhesiveness between the gas-barrier material and caps and of the poor sealability of caps for containers.

Japanese Patent Application Laid-Open (JP-A) Hei-10-1579 (European Patent Laid-Open 761,752) discloses one example of gas-barrier gaskets. Briefly, it discloses a container packing (gasket) made of a multi-layered sheet comprising a resin composition layer and a polyethylene layer, in which the resin composition comprises a matrix phase of an ethylene-vinyl alcohol copolymer and domains of a block copolymer having aromatic vinyl polymer blocks and isobutylene polymer blocks, the domains being dispersed in the matrix phase. However, in the process of producing the gasket of such a multi-layered sheet, blanking scrap is inevitable. In addition, metal caps only are used in the Examples in the laid-open patent publication, and nothing is referred to therein relating to plastic caps.

SUMMARY OF THE INVENTION

The present invention is to obtain container caps having excellent gas-barrier properties and sealability for containers.

We, the present inventors have assiduously studied, and, as a result, have found that a container cap having, as a sealing gasket, a layer of a resin composition as adhered to the surface of the cap body of polypropylene, wherein the resin composition comprises (A) from 25 to 70% by weight of an ethylene-vinyl alcohol copolymer (hereinafter this may be referred to as EVOH) having an ethylene content of from 20 to 60 mol % and a degree of saponification of at least 96% and (B) from 30 to 75% by weight of a polyolefin having a propylene or 1-butene content of at least 50 mol %, has extremely excellent gas-barrier properties, sealability for container bodies and adhesiveness between the cap and the gasket. On the basis of this finding, we have completed the present invention.

Preferably, the resin composition contains (C) from 1 to 20% by weight of a compatibilizer, thereby having improved compatibility. Preferred examples of the compatibilizer include a carboxylic acid-modified polyolefin; a saponified product of an ethylene-vinyl acetate copolymer having an ethylene content of from 75 to 99 mol % and a degree of saponification of at least 40 mol %; an ionomer; a carboxylic acid-modified polyolefin combined with a polyamide, etc.

Also preferably, the component (B) is a polyolefin having a 1-butene content of at least 50 mol %, or a polyolefin having a propylene content of from 50 to 95 mol %, in view of the sealability for containers.

Further preferably, the resin composition is in the form of such that resin particles of the polyolefin (B) are dispersed in a matrix of the ethylene-vinyl alcohol copolymer (A), in view of the gas-barrier properties of the composition.

As one preferred embodiment of its structure, the sealing gasket comprises two layers adhered to each other, of which one layer adhered to the cap body is of a resin composition that comprises (A) from 25 to 70% by weight of an ethylene-vinyl alcohol copolymer having an ethylene content of from 20 to 60 mol % and a degree of saponification of at least 96% and (B) from 30 to 75% by weight of a polyolefin having a propylene or 1-butene content of at least 50 mol %, and the other layer to be in contact with the contents of a container is of a polyolefin having a 1-butene content of at least 50 mol % or of a polyolefin having a propylene content of from 50 to 95 mol %.

DETAILED DESCRIPTION OF THE PREFERRED EMBODIMENTS

Figure 1:
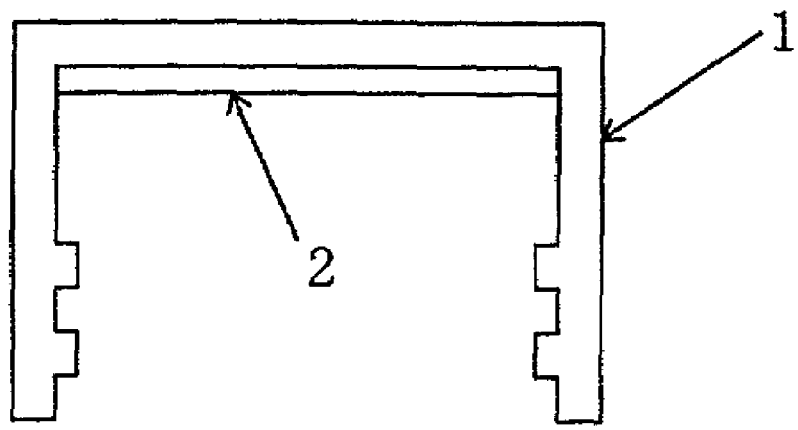
FIG. 1 is a cap integrated with a single-layered gasket.

The ethylene content of EVOH for use in the invention is from 20 to 60 mol %, but preferably from 25 to 55 mol %, more preferably from 30 to 48 mol %. If the ethylene content is less than 20 mol %, the gas-barrier properties of the composition in high humidity are poor and, in addition, the melt moldability of the composition is poor. If, on the other hand, the ethylene content is more than 60 mol %, the composition could not have good gas-barrier properties.

The vinyl ester moiety in EVOH for use in the invention has a degree of saponification of at least 96%, but preferably at least 98%. Where two or more different types of EVOH each having a different degree of saponification are mixed for use in the invention, the degree of saponification of the mixed EVOH shall be a mean value to be calculated on the basis of the mixing ratio by weight. If the degree of saponification of EVOH is less than 96 mol %, not only the gas-barrier properties of the composition in high humidity are poor, but also the heat stability of EVOH itself is poor, thereby often resulting in that the shaped articles of the composition have gels and fish eyes.

The ethylene content and the degree of saponification of EVOH can be obtained through nuclear magnetic resonance (NMR).

If desired, EVOH may be copolymerized with a small amount of any other comonomers without detracting from the object of the invention. Examples of the comonomers include α-olefins such as propylene, 1-butene, isobutene, 4-methyl-1-pentene, 1-hexene, 1-octene, etc.; unsaturated carboxylic acids, their salts, their partial or complete esters, their nitrites, their amides, and their anhydrides, such as itaconic acid, methacrylic acid, acrylic acid, maleic anhydride, etc.; vinylsilane compounds such as vinyltrimethoxysilane, etc.; unsaturated sulfonic acids and their salts; alkylthiols; vinylpyrrolidones, etc.

The polyolefin (B) for use in the invention is not specifically defined, provided that it is a homopolymer or copolymer having a propylene or 1-butene content of at least 50 mol %. The comonomers for it include α-olefins such as ethylene, propylene, 1-butene, 1-hexene, 1-octene, 4-methyl-1-pentene, etc.; diolefins; vinyl compounds such as N-vinylcarbazole, vinyl chloride, vinylidene chloride, vinyl acetate, styrene, acrylonitrile, vinyl ether, etc.; unsaturated carboxylic acids such as maleic acid, acrylic acid, methacrylic acid, ethacrylic acid, fumaric acid, itaconic acid, etc., and their esters and anhydrides; as well as their adducts with hydroxyl or epoxy groups. Various copolymers are employable herein, for example, including copolymers of polyolefins grafted with comonomers; ionomer resins that are reaction products of α-olefin/α,β-unsaturated carboxylic acid copolymers with ionic metal compounds, etc. Two or more different types of those polyolefinic resins may be mixed for use herein, provided that the resulting resin mixture has a total propylene or 1-butene content of at least 50 mol %.

The propylene or 1-butene content of the polyolefin (B) is at least 50 mol %, but preferably at least 60 mol %, more preferably at least 70 mol %. If the content is less than 50 mol %, the adhesiveness of the composition to cap bodies is extremely poor.

Preferably, the component (B) is a polyolefin having a 1-butene content of at least 50 mol %, or a polyolefin having a propylene content of from 50 to 95 mol %, as the sealability for containers is good. If, for example, a polyolefin having a propylene content of more than 95 mol % is used as the component (B), the modulus of elasticity of the resin composition will be too high since the modulus of elasticity of the polyolefin itself is high, thereby often causing liquid leakage out of containers if lightly screwed with caps.

The amount of the ethylene-vinyl alcohol copolymer (A) to be in the resin composition of the invention is from 25 to 70% by weight, but preferably from 30 to 65% by weight, more preferably from 35 to 60% by weight. If the amount of the component (A) therein is less than 25% by weight, the gas-barrier properties of the composition are extremely poor. If, on the other hand, the amount is more than 70% by weight, the adhesiveness of the composition to cap bodies is poor and is unacceptable in practical use.

The amount of the polyolefin (B) to be in the resin composition of the invention is from 30 to 75% by weight, but preferably from 35 to 70% by weight, more preferably from 40 to 65% by weight. If the amount of the component (B) therein is less than 30% by weight, the adhesiveness of the composition to cap bodies is poor and is unacceptable in practical use. If, on the other hand, the amount is more than 75% by weight, the composition could not exhibit gas barrier properties.

Adding a compatibilizer (C) in an amount of from 1 to 20% by weight, preferably from 2 to 18% by weight, more preferably from 5 to 15% by weight, to the resin composition of the invention is preferred, as improving the compatibility of the ethylene-vinyl alcohol copolymer with the polyolefin (B), while increasing the adhesion strength of the resin composition to cap bodies and increasing the mechanical strength of the composition. In addition, the compatibilizer (C) stabilizes the compositional ratio in industrial applications.

The compatibilizer is not specifically defined, provided that it is a resin having an affinity for both the EVOH (A) and the polyolefin (B).

Typical examples of the compatibilizer are polyolefins having various polar groups, which include, for example, carboxylic acid-modified polyolefins, epoxy-modified polyolefins, hydroxy group-containing polyolefins, ester group-containing polyolefins, etc.

Of those, preferred are carboxylic acid-modified polyolefins. The carboxylic acid-modified polyolefins referred to herein are polyolefins having carboxyl groups in the molecule. Their examples include polyolefins as graft-modified with α,β-unsaturated carboxylic acid or their anhydrides; and random copolymers of olefin monomers with α,β-unsaturated carboxylic acid or their anhydrides.

For the polyolefin moiety to be the base of the carboxylic acid-modified polyolefins, employable are various polyolefins such as polyethylenes [low-density polyethylene (LDPE), linear low-density polyethylene (LLDPE), very-low-density polyethylene (VLDPE)], polypropylenes, polypropylene copolymers, ethylene-vinyl acetate copolymers, ethylene-(meth)acrylate copolymers, etc.

The α,β-unsaturated carboxylic acids and their anhydrides include acrylic acid, methacrylic acid, maleic acid, itaconic acid, maleic anhydride, itaconic anhydride, etc. Preferred is maleic anhydride.

The content of the α,β-unsaturated carboxylic acid or its anhydride may be from 0.0005 to 5 mol %, but preferably from 0.001 to 1 mol %, more preferably from 0.001 to 0.4 mol %. If the content is less than 0.0005 mol %, the dispersibility in EVOH in blending them is poor. However, if more than 5 mol %, the viscosity while blending will be too high, and the melt moldability of the composition becomes poor. It is desirable that all polyolefin used for the compatibilizer is modified with an α,β-unsaturated carboxylic acid or its anhydride, but, as the case may be, the compatibilizer may be a blend of a highly carboxylic acid-modified polyolefin and a non-modified polyolefin to have a final degree of modification falling within the defined range.

Of the carboxylic acid-modified polyolefins, especially preferred are those in which all or a part of the carboxyl groups dangling around the polyolefin moiety are in the form of metal salts, or that is, so-called ionomers, as having better compatibility.

Combined with a carboxylic acid-modified polyolefin, a polyamide is also preferably used as the compatibilizer, as exhibiting better compatibility. The carboxylic acid-modified polyolefin to be combined is preferably an ethylene-(meth)acrylic acid copolymer or its metal salt, ionomer. The amount of the polyamide to be combined is not specifically defined, but is preferably from 1/20 to 10 times, more preferably from 1/10 to 5 times, even more preferably from 1/5 to 2 times the weight of the carboxylic acid-modified polyolefin.

Still another preferred example of the compatibilizer (C), except for carboxylic acid-modified polyolefins, is a saponified product of an ethylene-vinyl acetate copolymer having an ethylene content of from 75 to 99 mol % and a degree of saponification of at least 40%. The saponified products of that type also exhibit good compatibility, like the carboxylic acid-modified polyolefins.

The resin composition of the invention exhibits better gas-barrier properties, when it is in theform of such that resin particles of the polyolefin (B) are dispersed in a matrix phase of the ethylene-vinyl alcohol copolymer (A). Though not clear as yet, the reason why the resin composition in which the component (A) forms a matrix phase is still adhesible to cap bodies of polypropylene would be because fine particles of the polyolefin (B) could exist in the surface of the composition or could be extremely near to the surface thereof while contributing to the adhesiveness of the composition to cap bodies.

The resin composition of the invention may optionally contain various additives, if desired. Examples of the additives include antioxidants, plasticizers, heat stabilizers, antistatic agents, lubricants, colorants, fillers, and other polymer compounds. Any of those additives may be in the composition within the range not interfering with the effects and the advantages of the invention.

The material of cap bodies for use in the invention is polypropylene, in view of its adhesiveness to the composition of the invention, and of its mechanical characteristics, dimensional stability, solvent resistance, etc. The polypropylene may be any of isotactic polypropylene or syndiotactic polypropylene, and it may be copolymerized with a small amount of other comonomers. The material of polypropylene may optionally contain various additives of antioxidants, plasticizers, heat stabilizers, antistatic agents, lubricants, colorants, fillers, and even other polymer compounds, within the range not interfering with the effects and advantages of the invention.

To form cap bodies, employable is any known method of injection molding, disc molding, compression molding or the like.

The composition of the invention may be formed into single-layered sealing gaskets, or may also be in multi-layered gaskets comprising at least one layer of the composition. In the latter case of multi-layered structures, in general, a layer of the composition is disposed between the gasket of polyolefin and the cap body.

For sealing gaskets comprising two layers adhered to each other, it is desirable that one layer to be adhered to the cap body is of the resin composition of the invention while the other layer to be in contact with the contents of a container is of a polyolefin having a 1-butene content of at least 50 mol % or of a polyolefin having a propylene content of from 50 to 95 mol %. In this structure, the reason why the polyolefin resin comprising, as the major component, 1-butene or propylene is used to form the layer to be in contact with the contents of a container is for ensuring the adhesiveness of the layer to the other layer of the resin composition of the invention. In addition, the layer to be in contact with the contents of a container must have sealability. For this, therefore, preferred is a resin having flexibility in some degree, and a hard resin having a propylene content of more than 95 mol % is not preferred.

The method of blending the components to form the composition of the invention is not specifically defined. For example, the thermoplastic resin pellets may be dry-blended and directly melt-molded. More preferably, however, the constituent components are kneaded in a Bumbury mixer or through a single-screw or double-screw extruder while being pelletized, and the resulting resin blend pellets are melt-molded. In order to obtain a uniform resin blend dispersion and to prevent the dispersion from producing or having gels and agglomerates, it is desirable that the kneading and pelletization for the resin blend is effected by the use of an extruder capable of blending the components in a high degree, while the hopper mouth is sealed with nitrogen gas, and that the extrusion is effected at low temperatures.

To form container caps using the resin composition of the invention, employable is any known method of compression molding, injection molding, sheet molding or the like. For the compression molding method and the injection molding method, known are two different processes. In one process, a gasket is formed in a mold while being integrated with a previously-formed cap body having been set in the mold. In the other process, a cap body and a gasket are separately molded and are then integrated together in any known manner, for example, by heating them or ultrasonically bonding them. Any of those processes is employable herein. Above all, however, most preferred is the compression molding method in which a gasket is formed while being integrated with a previously-formed cap body, in view of the equipment and the production costs for it. In the sheet molding method, gaskets and cap bodies must be separately formed, and then they are integrated together. The outline of each molding method is described below.

Compression Molding Method:

A melt of the resin composition is dropped onto a female mold, which is then compressed with a male mold to form a gasket. In this method, where the gasket is formed while being integrated with a previously-formed cap body, the cap body is set in the female mold for the gasket, and a resin melt for the gasket is dropped onto the cap body and then compressed. To produce multi-layered gaskets, the process shall be repeated. Depending on the number of the repeated cycles, obtained are multi-layered gaskets having the desired number of plural layers.

Injection Molding Method:

A melt of the resin composition is injected into a mold. In this method, where a gasket is formed while being integrated with a previously-formed cap body, the cap body is set in the mold, and a resin melt for the gasket is injected into the mold. To produce multi-layered gaskets, the process shall be repeated. Depending on the number of the repeated cycles, obtained are multi-layered gaskets having the desired number of plural layers.

Sheet Molding Method:

The resin composition is formed into a sheet through extrusion, and gaskets are blanked out of the sheet. Multi-layered sheets can be produced through co-extrusion or lamination.

Containers with the cap of the invention have many application in various fields. In particular, the superiority of using the resin composition of the invention having excellent gas-barrier properties is significantly noted when it is used for various packaging containers. The containers are especially favorable to packaging containers for foods, medicines, agricultural chemicals and the like that may be deteriorated by oxygen.

EXAMPLES

Now, the invention is described in more detail with reference to the following Examples, which, however, are not intended to restrict the scope of the invention. The resins used in the Examples are shown in Tables 1 to 3.

The details of the test methods employed herein are mentioned below.

Barrier Properties (Oxygen Transmission Rate):

A resin composition sample was melt-extruded through a T-die at 240° C. into a film having a thickness of 40μ. The film was conditioned at 20° C. and 65% RH, and the oxygen transmission rate through the film was measured at 20° C. and 65% RH, according to JIS K7126, for which was used an oxygen transmission tester, Ox-Tran 10/50 Model (manufactured by Modern Control Inc., USA). The oxygen transmission rate as referred to herein is obtained as follows: The amount of oxygen having passed through a single-layered film having a non-defined thickness is measured in a unit of ml/m$^2$·day·atm, and this is converted into the amount of oxygen to pass through the same single-layered film having a defined thickness of 20 μm in a unit of ml·20 μm/m$^2$·day·atm. The latter indicates the oxygen transmission rate through the film measured.

Sealability (Contents-sealing Test):

A cylindrical polyester blow bottle having a capacity of 500 ml was filled with 200 ml of water, and screwed with a cap sample in different manners mentioned below. The thus-screwed bottle was held in hand at its body, and greatly shaken 20 times up and down. After this, the bottle was checked for liquid leakage, if any, and was evaluated according to the four-rank criteria mentioned below.

A: When the bottle was screwed lightly with fingers, no water leaked out.

B: When the bottle was screwed lightly with fingers, water leaked out to the screwed area.

C: When the bottle was screwed lightly with fingers, water leaked out of the cap. However, when it was screwed tightly, no water leaked out.

D: Even when the bottle was screwed tightly, water leaked out.

Adhesiveness:

The adhesiveness between a cap body and a gasket, and the interlayer adhesiveness between the adjacent layers in a multi-layered gasket were measured by peeling them by hand at their interlayer, and were evaluated according to the following criteria:

A: Not peeled at all.

B: Peeled, but the adhesiveness was extremely high.

C: The adhesiveness was high and acceptable in practical use.

D: Easily peeled, and the adhesiveness was not acceptable in practical use.

Dispersed Condition of Resin Composition:

A cross section of a resin pellet was observed with an optical microscope to know the type of the resin having formed the matrix phase and that having formed the domain phase and to know the dispersed condition. The resins were identified by staining EVOH (A) with iodine in microscopic observation.

TABLE 1

Ethylene-Vinyl Alcohol Copolymer (A)

| Resin No. | Ethylene Content (mol %) | Degree of Saponification (mol %) | MFR (g/10 min., 190° C., 2160 g) |
|---|---|---|---|
| A-1 | 44 | 99.5 | 5.5 |
| A-2 | 32 | 99.5 | 4.0 |

TABLE 2

Polyolefinic Resin (B)

| Resin No. | Composition | MFR (g/10 min., 190° C., 2160 g) |
|---|---|---|
| B-1 | Ethylene-1-butene copolymer (ethylene content: not more than 1 mol %) | 2.0 |
| B-2 | Ethylene-propylene copolymer (ethylene content: 25 mol %) | 2.0 |
| B-3 | Ethylene-1-butene copolymer (ethylene content: 93 mol %) | 3.0 |
| B-4 | Ethylene-vinyl acetate copolymer (ethylene content: 89 mol %) | 2.0 |
| B-5 | Polypropylene (homopolymer) | 2.0 |

TABLE 3

Compatibilizer (C)

| Resin No. | Composition |
|---|---|
| C-1 | Polyamide/ionomer blend (Mitsui DuPont Chemical's Himilan AM79261) |
| C-2 | Ionomer (Mitsui DuPont Chemical's Himilan S1856) |
| C-3 | Saponified Product of ethylene-vinyl acetate copolymer (ethylene content: 89 mol %, degree of saponification: 97 mol %) |
| C-4 | Carboxylic acid-modified polypropylene (Mitsui Chemical's Adomer QF551A) |

Example 1

40 parts by weight of resin (A), 50 parts by weight of resin (B) and 10 parts by weight of resin (C), all mentioned below, were pre-mixed in a tumbler, and melt-kneaded and pelletized through a 30 mmφ double-screw extruder equipped with kneading discs (TEX30 Model manufactured by The Japan Steel Works; L/D=30), in which the cylinder temperature was 190° C. at the bottom of the feeder and was 210° C. in the kneading zone and in the vicinity of the nozzle, the number of revolution of the rotor for extrusion was 610 rpm, and the number of revolution of the motor for the feeder was 250 rpm. Thus were obtained resin composition pellets.

(A) Ethylene-vinyl alcohol copolymer (A-1)
   This has an ethylene content of 44 mol %, a degree of saponification of 99.6%, and an MFR of 5 g/10 min (at 210° C. under a load of 2160 g).

(B) Ethylene-1-butene copolymer (B-1)
   Shell Chemical's POLYBUTYLENE 8240
   This is a copolymer of 1-butene (at least 99 mol %) and ethylene (at most 1 mol %), having a density of 0.908 g/cm$^3$, and an MFR of 2.0 g/10 min (at 210° C. under a load of 2160 g).

(C) Carboxylic acid-modified polyolefin (C-1)
   Mitsui Chemical's Adomer QF551A
   This is a maleic anhydride-grafted polypropylene, having an MFR of 5.7 g/10 min (at 210° C. under a load of 2160 g).

The pellets prepared were melt-extruded at 240° C. into a film. The film had an oxygen transmission rate of 14 cc·20μ/day·atm. Regarding the morphology of the resin composition of the pellets, fine particles of the ethylene-1-butene copolymer (B) were dispersed in a matrix of the EVOH (A).

Figure 2:
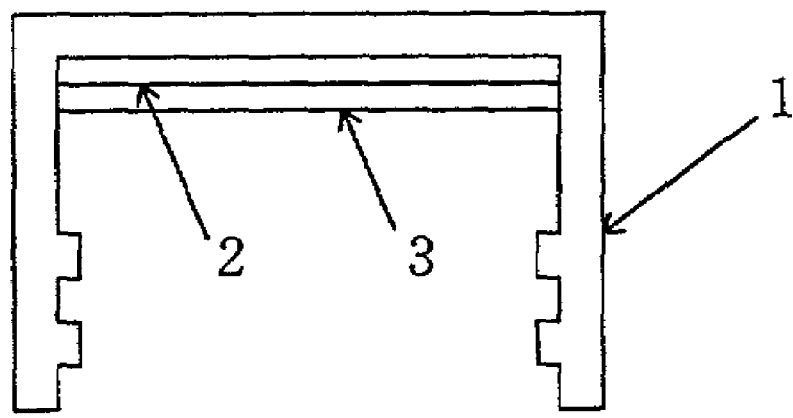
FIG. 2 is a cap integrated with a multi-layered gasket.

Next, the pellets were fed into a compression-molding machine for forming gaskets, in which a screw cap body (1) of polypropylene having an outer diameter of 65 mm and a bottom thickness of 1.2 mm was previously set in the mold. In the machine, the resin melt of the pellets was directly dropped onto the cap body, and compressed into a first gasket layer (2) to produce a cap integrated with a single-layered gasket (FIG. 1). Next, the thus-obtained, single-layered gasket-integrated cap was set in the mold of a gasket-molding machine of the same type as above, and the same ethylene-1-butene copolymer as in the resin composition used hereinabove was applied thereto, and compressed into a second gasket layer (3) to produce a cap integrated with a multi-layered gasket (FIG. 2). In this process, the cylinder temperature in the compression-molding machine was controlled to be 245° C., the nozzle temperature was 235° C., and the mold temperature was 30° C. The thickness of each gasket layer formed was 200 μm.

The adhesiveness between the body and the gasket of the cap thus produced, and the interlayer adhesiveness between the gasket layers were both in the rank of "A", which is well acceptable in practical use. The sealability of the cap for containers was also evaluated to be in the rank of "A", and the cap had good sealability.

Examples 2 to 19, and Comparative Examples 1 to 9

Various caps were produced and evaluated in the same manner as in Example 1, except that the constitution of the gasket was varied as in Table 4. To produce the single-layered gasket samples, the second compression-molding operation in the process of Example 1 was omitted. The test results obtained are shown in Table 4.

TABLE 4

Constitution of Caps and Test Results

|  | First Gasket Layer (barrier layer) | | | Second Gasket Layer | Test Results | | | |
|---|---|---|---|---|---|---|---|---|
|  | Component, Composition (wt. %) | | | | Adhesiveness | | Barrier Properties[1] | Sealability |
|  | Component A | Component B | Component C |  | body/ gasket | interlayer of gasket |  |  |
| Example 1 | A-1 40% | B-1 50% | C-1 10% | B-1 | A | A | 14 | A |
| Example 2 | A-2 40% | B-1 50% | C-1 10% | B-1 | B | A | 0.2 | A |
| Example 3 | A-1 40% | B-2 50% | C-1 10% | B-1 | A | B | 15 | A |
| Example 4 | A-1 40% | B-2 50% | C-1 10% | B-2 | A | A | 15 | B |
| Example 5 | A-1 40% | B-5 50% | C-1 10% | B-1 | B | B | 16 | A |
| Example 6 | A-1 65% | B-1 25% | C-1 10% | B-1 | C | C | 7.0 | A |
| Example 7 | A-1 35% | B-1 55% | C-1 10% | B-1 | A | A | 35 | A |
| Example 8 | A-1 40% | B-1 50% | C-2 10% | B-1 | B | A | 12 | A |
| Example 9 | A-1 40% | B-1 50% | C-3 10% | B-1 | B | B | 11 | A |
| Example 10 | A-1 40% | B-1 50% | C-4 10% | B-1 | B | B | 14 | A |
| Example 11 | A-1 40% | B-1 60% | — | B-1 | C | B | 16 | A |
| Example 12 | A-1 40% | B-1 50% | C-1 10% | — | A | — | 14 | B |
| Example 13 | A-1 40% | B-1 50% | C-2 10% | — | B | — | 12 | B |
| Example 14 | A-1 40% | B-1 50% | C-3 10% | — | B | — | 11 | B |
| Example 15 | A-1 40% | B-1 50% | C-4 10% | — | B | — | 14 | B |
| Example 16 | A-1 40% | B-2 50% | C-1 10% | — | B | — | 15 | B |
| Example 17 | A-1 40% | B-5 50% | C-1 10% | — | B | — | 12 | C |
| Example 18 | A-1 40% | B-1 60% | — | — | C | — | 16 | B |
| Example 19 | A-1 40% | B-2 60% | — | — | C | — | 18 | C |
| Comparative Example 1 | A-1 100% | — | — | B-1 | D | D | 0.8 | A |
| Comparative Example 2 | — | B-1 100% | — | B-1 | A | A | 5000 | A |
| Comparative Example 3 | A-1 40% | B-4 50% | C-1 10% | B-4 | D | A | 18 | A |
| Comparative Example 4 | A-1 75% | B-1 15% | C-1 10% | B-1 | D | D | 5.0 | A |
| Comparative Example 5 | A-1 20% | B-1 70% | C-1 10% | B-1 | A | A | 2000 | A |
| Comparative Example 6 | A-1 40% | B-3 50% | C-1 10% | B-3 | D | B | 12 | B |
| Comparative Example 7 | A-1 100% | — | — | — | D | — | 0.8 | D |
| Comparative Example 8 | — | B-1 100% | — | — | A | — | 5000 | A |
| Comparative Example 9 | A-1 75% | B-1 15% | C-1 10% | — | D | — | 5.0 | D |

[1] cc · 20 μ/m² · day · atm.

EFFECTS OF THE INVENTION

The container cap of the invention has excellent gas-barrier properties and sealability for containers, and is suitable for packaging containers for foods, medicines, agricultural chemicals, etc.

What is claimed is:

1. A container cap having, as a sealing gasket, a layer of a resin composition as adhered to the surface of the cap body of polypropylene, wherein said resin composition comprises:

(A) from 35 to 60% by weight of an ethylene-vinyl alcohol copolymer having an ethylene content of from 20 to 60 mol % and a degree of saponification of at least 96%; and (B) from 40 to 65% by weight of a polyolefin having a 1-butene content of at least 50 mol % or a polyolefin having a propylene content of from 50 to 95 mol %.

2. The container cap of claim 1, wherein the resin composition is in a form such that resin particles of the polyolefin (B) are dispersed in a matrix of the ethylene-vinyl alcohol copolymer (A).

3. The container cap of claim 1, wherein the resin composition further comprises (C) from 1 to 20% by weight of a compatibilizer.

4. The container cap of claim 3, wherein the compatibilizer (C) is a saponified product of an ethylene-vinyl acetate copolymer having an ethylene content of from 75 to 99 mol % and a degree of saponification of at least 40%.

5. The container cap as claimed in claim 3, wherein the compatibilizer (C) is an ionomer.

6. The container cap as claimed in claim 3, wherein the compatibilizer (C) comprises a carboxylic acid-modified polyolefin and a polyamide.

7. The container cap of claim 3, wherein the compatibilizer (C) is a carboxylic acid-modified polyolefin.

8. The container cap of claim 7, wherein said carboxylic acid-modified polyolefin is a polyolefin graft-modified with a α,β-unsaturated carboxylic acid or an anhydride thereof, or a random copolymer of an olefin monomer with a α,B-unsaturated carboxylic acid or anhydride thereof.

9. A container cap having a sealing gasket, which comprises two layers adhered to each other, of which one layer adhered to the surface of the cap body of polypropylene is of a resin composition that comprises:

(A) from 35 to 60% by weight of an ethylene-vinyl alcohol copolymer having an ethylene content from 20 to 60 mol % and a degree of saponification of at least 96%; and (B) from 40 to 65% by weight of a polyolefin having a propylene or 1-butene content of at least 50 mol %, and the other layer being in contact with the contents of a container is of a polyolefin having a 1-butene content of at least 50 mol % or a polyolefin having a propylene content of from 50 to 95 mol %.

10. The container cap of claim 9, wherein the resin composition is in a form such that resin particles of the polyolefin (B) are dispersed in a matrix of the ethylene-vinyl alcohol copolymer (A).

11. The container cap of claim 9, wherein the resin composition further contains (C) from 1 to 20% by weight of a compatibilizer.

12. The container cap of claim 11, wherein said compatibilizer is a polyolefin graft-modified with an α,β-unsaturated carboxylic acid or an anhydride thereof, or a random copolymer of an olefin monomer with an α,β-unsaturated carboxylic acid or an anhydride thereof.

* * * * *